(12) United States Patent
Otte et al.

(10) Patent No.: US 9,829,691 B2
(45) Date of Patent: Nov. 28, 2017

(54) MICROSCOPE WITH AT LEAST ONE ILLUMINATING BEAM IN THE FORM OF A LIGHT SHEET

(71) Applicant: KARLSRUHER INSTITUT FÜR TECHNOLOGIE, Karlsruhe (DE)

(72) Inventors: Jens Christopher Otte, Hirschberg (DE); Uwe Straehle, Emmendingen (DE); Andrei Kobitski, Stutensee (DE); Gerd Ulrich Nienhaus, Karlsruhe (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 92 days.

(21) Appl. No.: 14/436,938

(22) PCT Filed: Sep. 4, 2013

(86) PCT No.: PCT/EP2013/002647
§ 371 (c)(1),
(2) Date: Apr. 20, 2015

(87) PCT Pub. No.: WO2014/063764
PCT Pub. Date: May 1, 2014

(65) Prior Publication Data
US 2015/0253560 A1 Sep. 10, 2015

(30) Foreign Application Priority Data
Oct. 23, 2012 (DE) .................. 10 2012 110 077

(51) Int. Cl.
*G02B 21/08* (2006.01)
*G02B 21/18* (2006.01)
(Continued)

(52) U.S. Cl.
CPC ......... *G02B 21/08* (2013.01); *G02B 21/0032* (2013.01); *G02B 21/34* (2013.01);
(Continued)

(58) Field of Classification Search
None
See application file for complete search history.

(56) References Cited

U.S. PATENT DOCUMENTS 8,213,081 B2 7/2012 Lippert et al.
8,482,854 B2 7/2013 Lippert et al.
(Continued)

FOREIGN PATENT DOCUMENTS

DE   102005027077 A1   5/2006
DE   102007015061 A1   10/2008
(Continued)

*Primary Examiner* — Derek S Chapel
(74) *Attorney, Agent, or Firm* — Leydig, Voit & Mayer, Ltd.

(57) ABSTRACT

A microscope includes at least one illuminating lens configured to guide at least one illuminating beam in the form of a light sheet for illuminating at least one specimen to be examined. The microscope also includes at least one detection lens configured to capture at least one detection beam issuing from the at least one specimen to be examined. The at least one illuminating lens has an optical axis at an angle α, which is not equal to 90°, to an optical axis of the at least one detection lens. The at least one illuminating beam enters the at least one illuminating lens at an entry angle β such that the light sheet lies within a focal plane of the at least one detection lens.

13 Claims, 10 Drawing Sheets

(51) Int. Cl.
  *G02B 21/36* (2006.01)
  *G02B 21/00* (2006.01)
  *G02B 21/34* (2006.01)
  G02B 21/24 (2006.01)

(52) U.S. Cl.
  CPC ......... *G02B 21/361* (2013.01); *G02B 21/367* (2013.01); *G02B 21/0076* (2013.01); *G02B 21/24* (2013.01)

(56) References Cited

U.S. PATENT DOCUMENTS

| | | |
|---|---|---|
| 8,970,950 B2 | 3/2015 | Stelzer |
| 9,030,734 B2 | 5/2015 | Knebel et al. |
| 2011/0261446 A1* | 10/2011 | Dunsby .............. G02B 21/0076 359/380 |
| 2012/0320438 A1* | 12/2012 | Knebel .............. G02B 21/0032 359/205.1 |

FOREIGN PATENT DOCUMENTS

| | | |
|---|---|---|
| DE | 102007018862 A1 | 10/2008 |
| DE | 102011000835 A1 | 8/2012 |
| WO | WO 2004053558 A1 | 6/2004 |
| WO | WO 2007124437 A2 | 11/2007 |
| WO | WO 2010012980 A1 | 2/2010 |
| WO | WO 2012122027 A2 | 9/2012 |

\* cited by examiner

MICROSCOPE WITH AT LEAST ONE ILLUMINATING BEAM IN THE FORM OF A LIGHT SHEET

CROSS REFERENCE TO RELATED APPLICATIONS

This application is a U.S. National Phase application under 35 U.S.C. §371 of International Application No. PCT/EP2013/002647 (WO 2014/063764 A1), filed on Sep. 4, 2013, and claims benefit to German Patent Application No. DE 10 2012 110 077.2, filed Oct. 23, 2012.

FIELD

The invention relates to microscopes, and in particular to microscopes having at least one illuminating beam having a specimen illumination region (light sheet) expanded transversely to the axis of the illuminating beam for illuminating a three-dimensional specimen to be examined.

BACKGROUND

Using existing, conventional, confocal microscopy, a three-dimensional specimen is scanned point by point in two-dimensional optical planes. This method is very time-consuming for capturing a three-dimensional specimen, in particular if the signal-to-noise ratio is to be optimised and reaches its limits in the case of a quick time sequence of three-dimensional images of a specimen.

WO 2004/053558 A1 discloses the method of so-called light sheet microscopy, in which an optimal image of a two-dimensional plane of the three-dimensional specimen is achieved by means of a homogenous illumination of an optical plane perpendicular to the detection lens. If a specimen is now moved through the light sheet, this results in a series of two-dimensional images and thus a three-dimensional image of the specimen. The advantages of this technique are a high imaging speed, high lateral resolution, great depth of penetration into the specimen and low excitation energy, particularly in the case of fluorescence images.

One problem with existing constructions is in particular the positioning of specimens in the light sheet. For this purpose it is simplest to secure the specimen and position it in front of the lens. Alternatively, the specimen is embedded into a cylinder, preferably in agarose with a low melting point, or is fixed in a clear container, preferably made from agarose with a low melting point or from a transparent polymer. Alternatively, cells fixed on a cover slip are held in the light sheet, see E. G. Reynaud et al., *Light sheet-based fluorescence microscopy: more dimensions, more photons, and less photodamage*, HFSP J. 2008, 2, 266-275.

This type of positioning is disadvantageous especially for large specimens, for example embryos, because they are each embedded in a matrix, which usually has different optical properties from the specimen itself and from the respective environment, for example air, water or saline solution. Furthermore, total embedding prevents the growth of biological specimens, for example embryos during time lapse images over several hours, which is particularly disadvantageous for in vivo microscopy of microscopically large specimens.

If cells are fixed on a microscope slide then they are positioned in the light sheet together with the slide. The slide is either positioned at an acute angle, approximately 45°, or parallel to the light sheet. If there is simultaneous illumination from two sides in the case of positioning at an acute angle, then an additional penetration of the slide from one of the two illumination sides results in changed optical properties. This is problematic inasmuch as, in optimal double-sided illumination, the same properties are desirable from both illumination sides.

If the slide holding the cells is orientated parallel to the light sheet, more scattered light occurs during illumination and detection near the glass surface, which brings about a poor signal-to-noise ratio. Therefore, in particular elements of a cytoskeleton, which are near the glass surface, are optically inaccessible.

A further disadvantage of existing devices for light sheet microscopy is the quick and correct positioning of the loose or embedded specimen in the light sheet. In existing constructions, a specimen is usually correctly aligned at the beginning of the measurement and (time-lapse) imaging is started. A rapid changeover between two or more specimens, i.e. so-called screening of a plurality of specimens at the same time on the same device, and their correct alignment relative to the light sheet is complex or impossible for various reasons. Firstly, each specimen has to be accurately positioned to the micron in all three spatial coordinates and this accuracy must be maintained for a long series of measurements, i.e. over several hours. Moreover, it must be ensured that all axes of rotation are maintained. The problems arising from the specifications referred to are obstructive in practice in light sheet microscopy, although they can be solved with a great deal of complexity.

Further specifications must, however, be considered. Confined spatial conditions result from the arrangement of the lens and the construction of the sample chamber, which lead to removal of the specimen from the fluid and storage outside of the sample chamber becoming necessary during the changeover of a specimen, which entails unwanted influences on a sensitive specimen, which are not acceptable especially over longer periods of time. A repetitive positioning of a series of specimens, which is accurate to the micron, for time-lapse images together with integrity of the samples cannot be ensured. Automation for non-repetitive serial imaging of a plurality of specimens or for repetitive serial imaging of a specific number of specimens over a period of time is therefore not possible.

A changeover of a detection lens and/or an illuminating lens is not easy to accomplish in the current prior art and requires, in particular for an automated change, special devices for light sheet microscopy. A suitable device for this is disclosed in DE 10 2007 018 862 A1. The disadvantage with this is that a change of lens is only possible in one axis. If more than one lens is to be used, these must be arranged in series, which normally causes problems with space. A simple change between air and immersion lenses is ruled out. If all of the lenses are immersion lenses it is necessary to arrange said lenses fully inside the specimen chamber, which is not practical in particular in the case of a plurality of lenses. Finally, revolving nosepieces, which are standard in light microscopy, cannot presently be used for light sheet microscopy.

A combination and thus a synergy of a light sheet microscope with an existing light microscope are difficult to achieve in contrast to confocal and multiphoton microscopy. Descriptions of an improved nosepiece and a combination with an upright microscope can be found in DE 10 2007 015 061 A1 and in Zanacchi et al., *Live-cell 3D super-resolution imaging in thick biological samples*, Nature Methods 2011, 8, 1047-1050.

In *Inclined Selective Plane Illumination Microscopy Adaptor for Conventional Microscopes*, Microscopy Research and Technique, published electronically on 27 Jun. 2012 under doi:10.1002/jemt.22089, F. Cutrale and E. Gratton describe a device for light sheet microscopy. Here, the same lens is used in a manner known as Highly inclined and laminated optical sheet microscopy (HILO), both as an illuminating lens and as a detection lens. The major disadvantage with this, namely the narrow field of view, is remedied here by a device for so-called Oblique plane microscopy (OPM), in which the focal plane of the image is refocused and recaptured using two additional air lenses, which are arranged at an angle relative to one another, which is not equal to 90°.

SUMMARY OF THE INVENTION

In an embodiment, the present invention provides a microscope including at least one illuminating lens configured to guide at least one illuminating beam in the form of a light sheet for illuminating at least one specimen to be examined and at least one detection lens configured to capture at least one detection beam issuing from the at least one specimen to be examined. An optical axis of the at least one illuminating lens is at an angle $\alpha$, which is not equal to 90°, to an optical axis of the at least one detection lens. The at least one illuminating beam enters the at least one illuminating lens at an entry angle $\beta$ such that the light sheet lies within a focal plane of the at least one detection lens.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment the present invention provides a microscope having at least one illuminating beam in the form of a light sheet and which overcomes certain disadvantages and restrictions of prior art microscopes.

A light sheet microscope according to an embodiment of the invention has at least one illuminating beam in the form of a specimen illumination region (light sheet) expanded transversely to the axis of the illuminating beam and simultaneously in the focal plane of the detection lens.

A light sheet microscope according to an embodiment of the invention has at least one illuminating lens to guide the at least one illuminating beam. In a particular embodiment there are at least two illuminating lenses, which are preferably arranged in the form of a nosepiece. The illuminating lenses are preferably either immersion or air lenses.

A light sheet microscope according to an embodiment of the invention has at least one detection device, which captures at least one detection beam issuing from a specimen to be examined, which is wholly or partially inside the specimen illumination region and is therefore illuminated by the at least one illuminating beam.

A light sheet microscope according to an embodiment of the invention has at least one detection lens to guide the at least one detection beam. In the process the at least one detection beam is particularly preferably guided in the optical axis of the at least one detection lens. In a particular embodiment there are at least two detective lenses, which are arranged in the form of a nosepiece.

A light sheet microscope according to an embodiment of the invention has an optical axis of at least one detection lens that is not perpendicular to the optical axis of the at least one illuminating lens, but rather assumes an angle $\alpha$ thereto, which preferably has a value of from 100° to 170°, more preferably a value of from 120° to 150°, in particular a value of approximately 135°.

In order to ensure that the at least one illuminating beam comes from the at least one illuminating lens at such an initial angle in relation to the optical axis of the at least one illuminating lens that the specimen illumination region (light sheet) comes to be located in the focal plane of the at least one detection lens, it is necessary for the at least one illuminating beam to enter the at least one illuminating lens outside the optical axis of the at least one illuminating lens at an entry angle $\beta$. Only in this manner can it be ensured that, despite the construction of the present light sheet microscope, which differs from the formerly standard right-angled arrangement of the at least one illuminating lens relative to the at least one detection lens, the light sheet is perpendicular to the optical axis of the at least one detection lens and aligns precisely with the focal plane of the at least one detection lens.

In an embodiment, structurally identical lenses are used for the at least one illuminating lens and for the at least one detection lens respectively. In particular, this makes it possible to reverse the light path and to use the at least one detection lens as an illuminating lens and vice versa, as a result of which—if a corresponding number of detection devices is present—an increased imaging speed and/or an increased light yield are facilitated.

In an embodiment there are at least two light sources, in particular pump lasers, which radiate different wavelengths that are detected by at least two detection devices, which are each sensitive to one of these wavelengths.

The specimen to be examined is located on a microscope stage. In an embodiment there is a slide (mount) located in between the specimen and the stage.

In an embodiment there is a first movement arrangement, which acts to generate a relative movement between the specimen illumination region and the specimen to be examined. In this way, the specimen is moved through the light sheet in order to obtain a series of two-dimensional images and thus a three dimensional image of the specimen.

In an embodiment, the specimen to be examined is placed on a fixed stage. In order to nevertheless move the specimen through the light sheet, in order to obtain a series of two-dimensional images and thus a three-dimensional image of the specimen, there is at least one device, which acts to change the angle $\beta$, and the focal plane of the at least one detection lens can be repositioned.

In a further embodiment, at least one of the present illuminating lenses and at least one of the present detection lenses are each constructed as immersion lenses and are located at least in part together with the specimen to be examined in an immersion medium.

In an embodiment there is a second movement arrangement, which allows the stage to be moved in a plane.

The construction of the light sheet microscope according to an embodiment of the invention overcomes the formerly standard right-angled arrangement of illuminating and detection lenses, which is associated with spatial limitations. This opens up new possibilities for the lenses in relation to capture technology and also for placing the specimen under examination on a stage and/or moving the specimen together with the stage. In this manner new possible applications come about.

A light sheet microscope according to an embodiment of the invention enables a simple positioning of the specimen on a stage. When the specimen is changed over, the specimen remains in the medium and does not leave it. A quick and easy changeover between various lenses for both illumination and also for detection is possible.

A light sheet microscope according to an embodiment of the invention enables an increased capture speed and/or an increased light yield as a consequence of simultaneous illumination and detection in two structurally identical lenses.

A light sheet microscope according to an embodiment of the invention enables acombination with conventional inverse microscopes and creates synergies therebetween. A combination with other microscope technologies, in particular epifluorescence or PALM, becomes easily possible, since the construction according to an embodiment of the invention allows the quick and easy changeover of lenses.

A light sheet microscope according to an embodiment of the invention enables a simple change of lens together with a simple positioning on a stage and makes possible a very versatile microscope for very different applications both for large and also for small specimens, from normal to high resolution, from the examination of single specimens right through to a so-called high throughput screening.

Figure 1A:
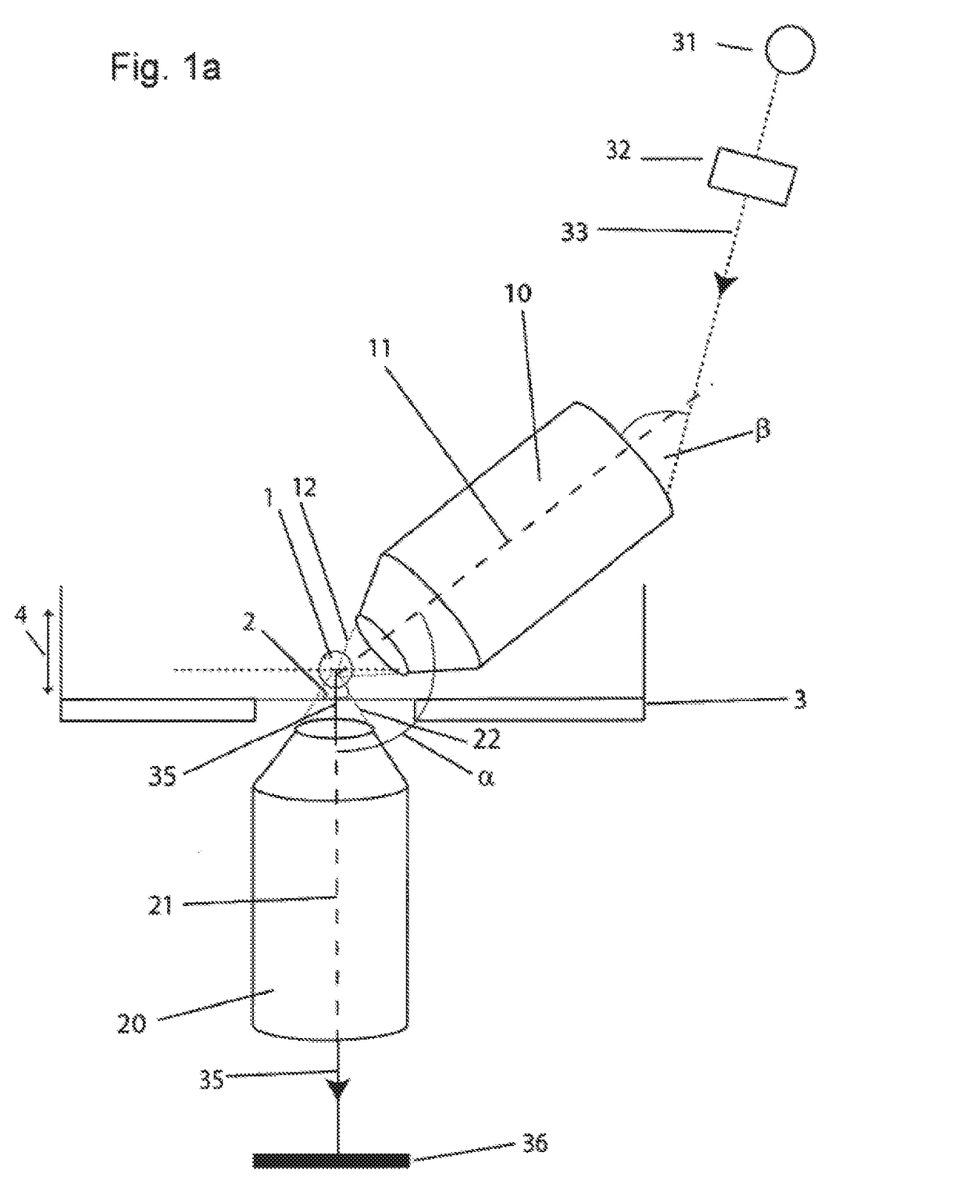
FIGS. 1a-1f are a schematic views of the construction and mode of operation of light sheet microscopes according to embodiments of the invention having one illuminating beam/lens and one detection beam/lens.
Figure 1B:
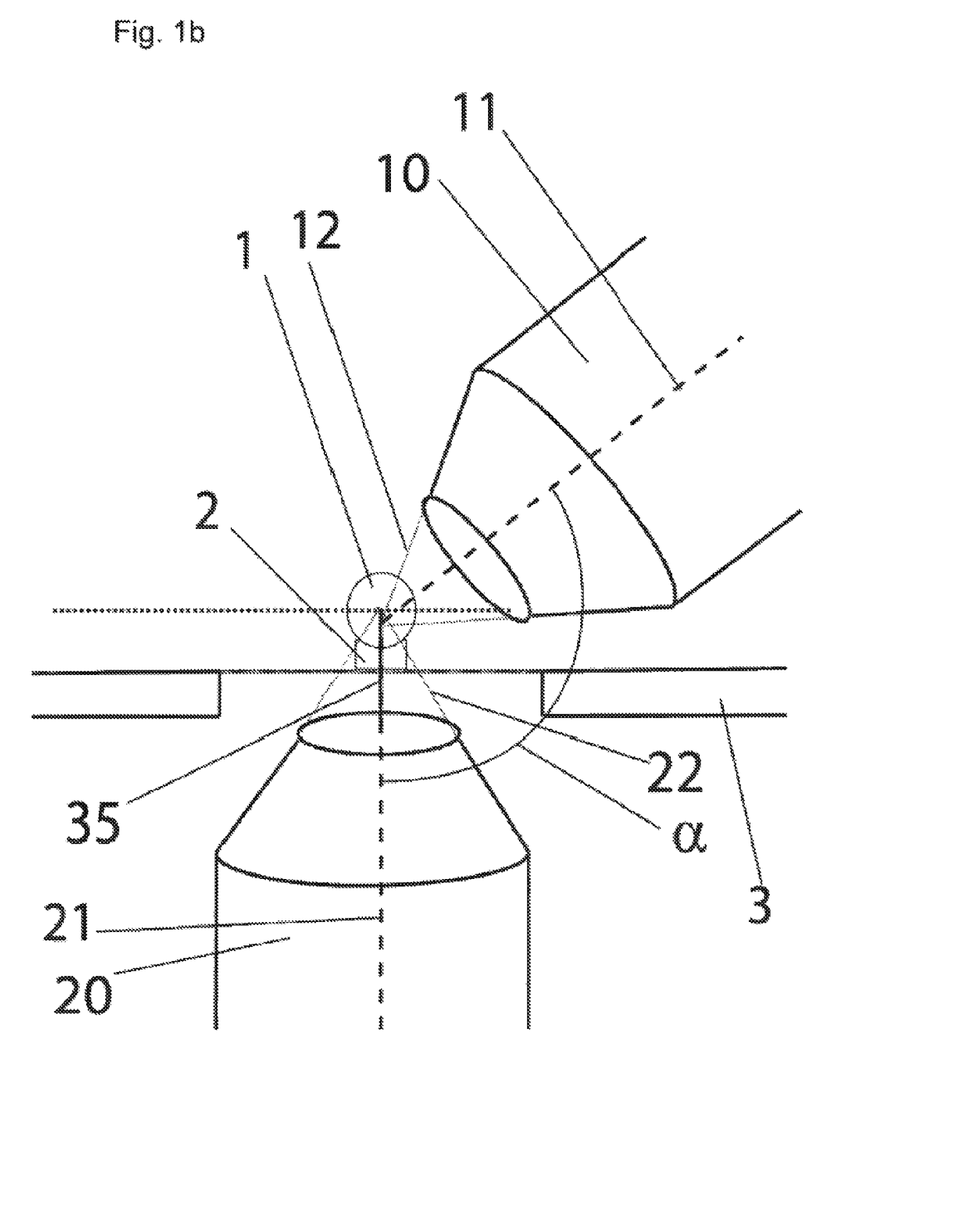
Figure 1C:
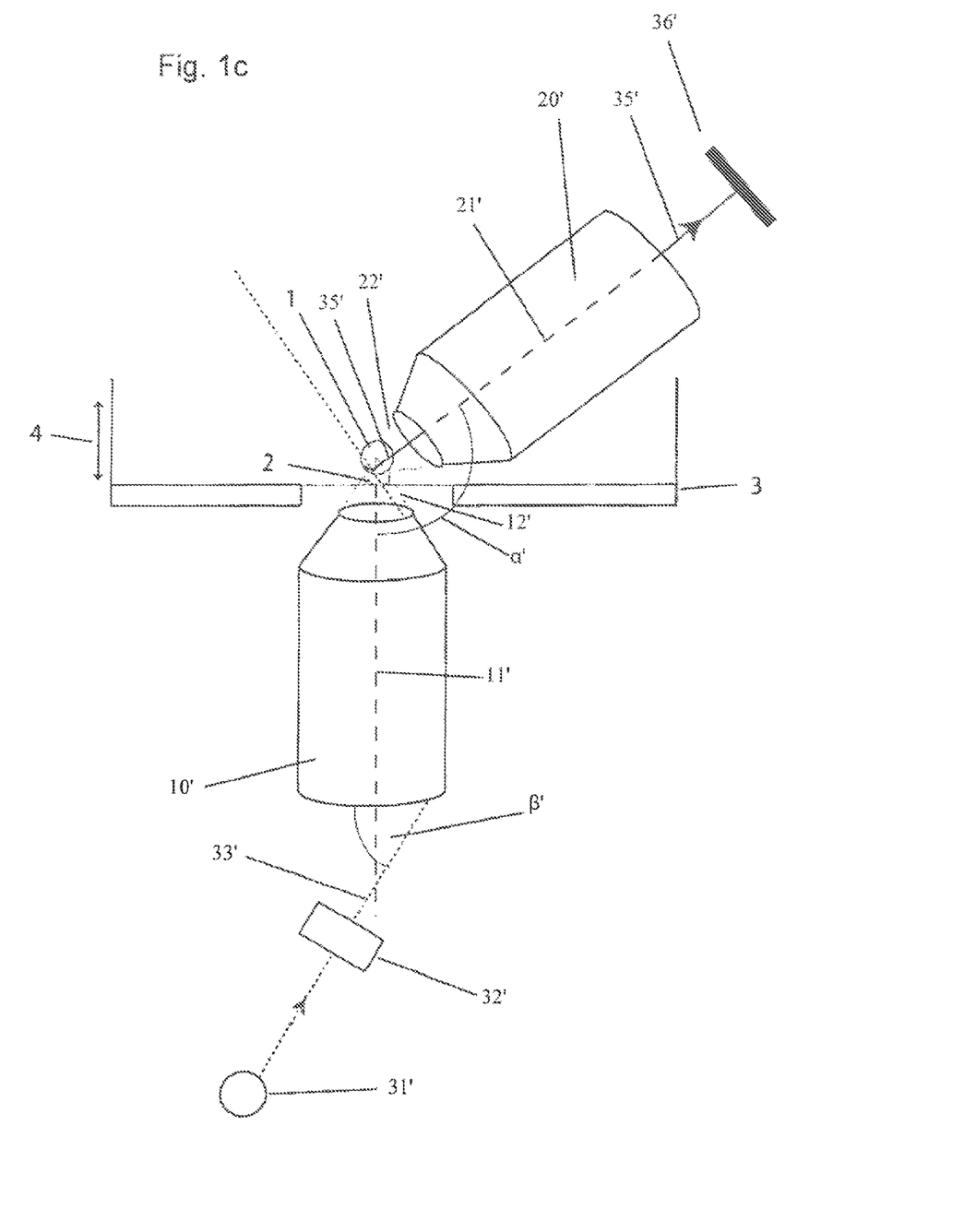
Figure 1D:
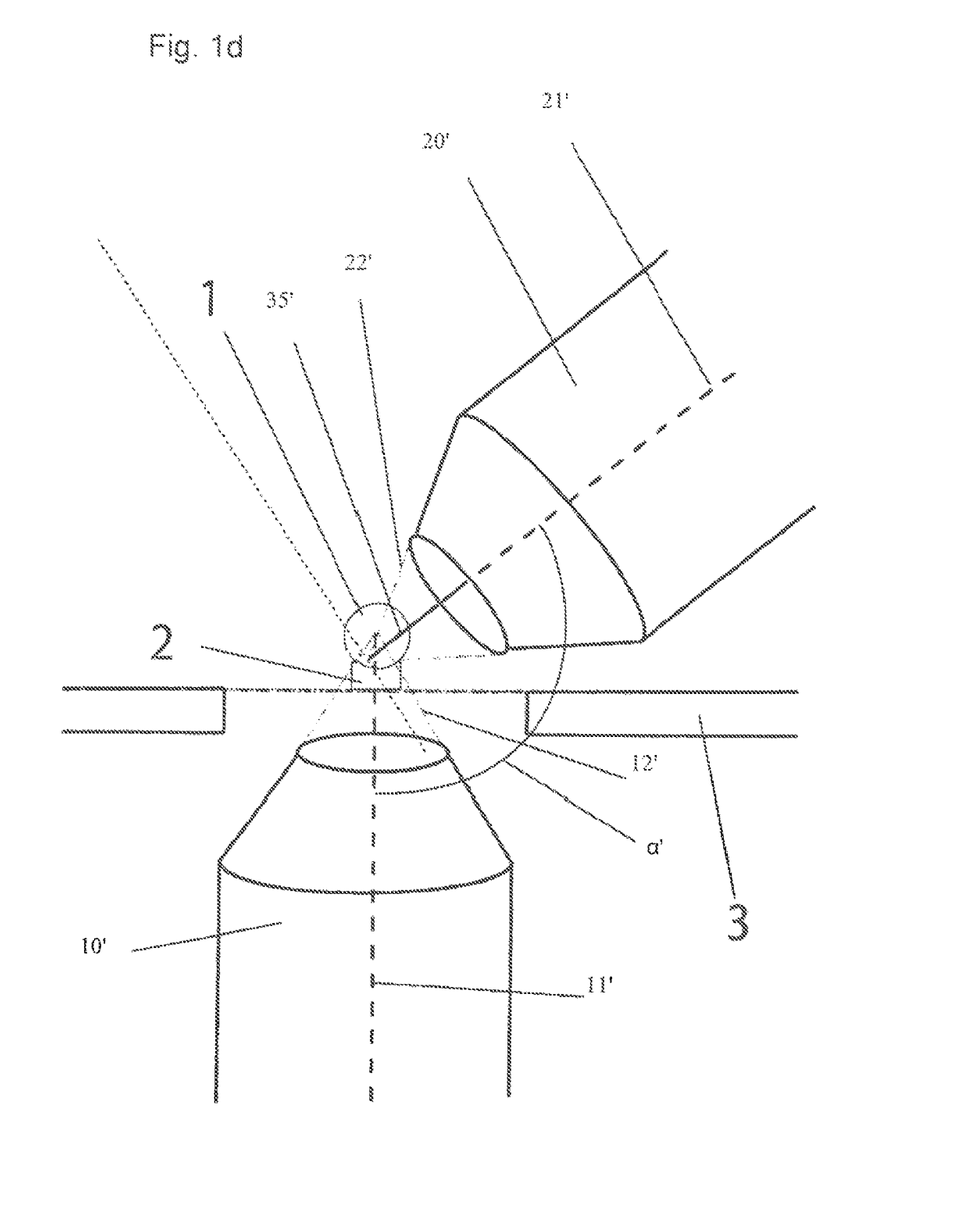
Figure 1E:
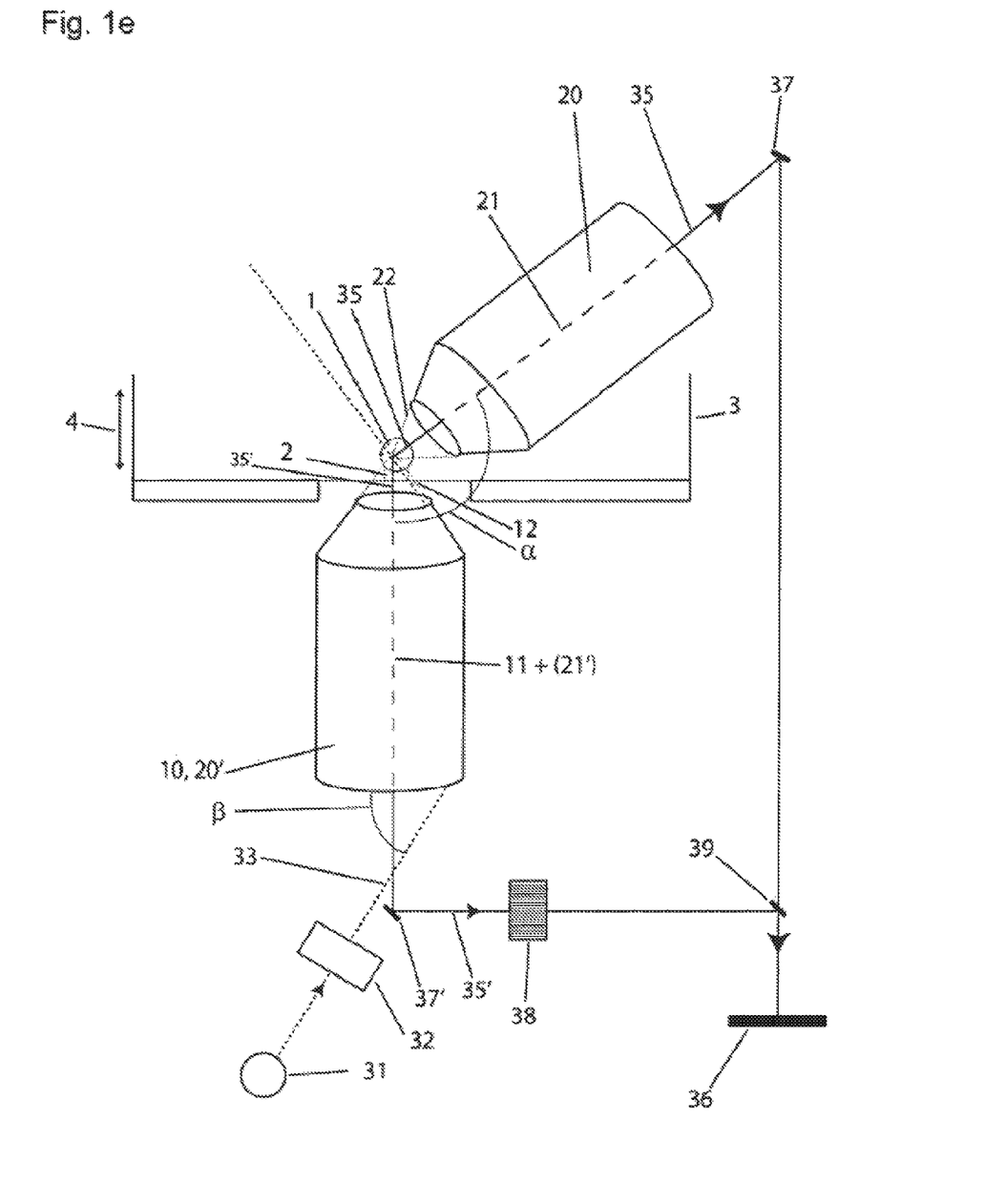
Figure 1F:
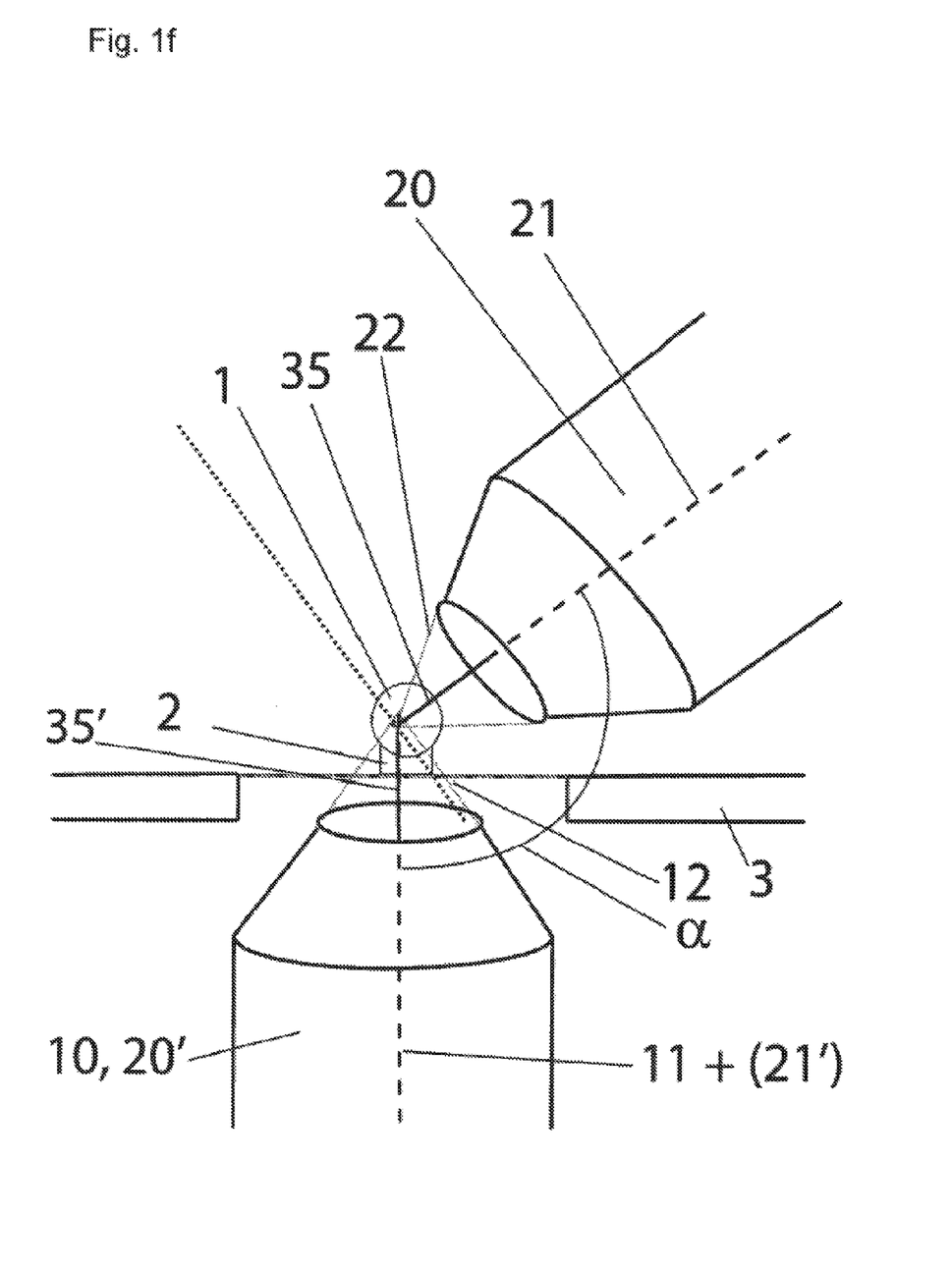

In the three embodiments shown in FIGS. 1a), 1c) and 1e), two lenses 10, 20 are arranged such that the optical axes 11, 21 of the two lenses 10, 20 adopt an angle $\alpha$ of approximately 135° relative to one another. The specimen (sample) 1 is on a suitable mount, for example agarose, as the slide 2, which can be moved in all spatial directions on a stage 3 by means of a movement arrangement 4. The two lenses 10, 20 are permanently installed.

According to the embodiment shown in FIG. 1a), a light sheet is generated in the first lens, which acts as an illuminating lens 10, by means of devices known from the prior art. This light sheet does not, however, extend parallel to the optical axis of the illuminating lens 10, as described in the prior art, but rather enters the illuminating lens 10 at a wide entry angle $\beta$ and outside the optical 11 axis thereof. This arrangement ensures that even at an angle $\alpha$ of approximately 135° of the optical axes 11, 21 of the lenses 10, 20 relative to one another, the light sheet nevertheless extends perpendicularly to the optical axis 21 and within the focal plane of the second lens, which acts as a detection lens 20. Detection of the detection beam 35, which issues from the specimen 1 and passes through the detection lens 20 along the optical axis 21 thereof, is performed by means of a detector 36, for which purpose a fast CCD camera or a sCMOS camera in can be used.

In the second embodiment shown in FIG. 1c), a light sheet is generated in the second lens, which now acts as an illuminating lens 10', by means of devices known from prior art. Here too, the light sheet does not extend parallel to the optical axis of the illuminating lens 10' as described in the prior art, but rather enters the illuminating lens 10' at a wide entry angle $\beta'$. This arrangement ensures here, too, that at an angle $\alpha'$ of approximately 135° of the optical axes 11', 21' of the lenses 10', 20' relative to one another, the light sheet nevertheless extends perpendicularly to the optical axis 21' of the first lens, which acts here as a detection lens 20'. Detection of the detection beam 35', which issues from the specimen 1 and passes through the detection lens 20' along the optical axis 21' thereof is also performed here by means of a detector 36'.

According to the third embodiment shown in FIG. 1e), a light sheet is generated in the first lens, which acts as an illuminating lens 10, which light sheet here too does not extend parallel to the optical axis of the illuminating lens 10, but rather enters the illuminating lens 10 at a wide entry angle $\beta$ and outside the optical 11 axis thereof. As a result of this, even at an angle $\alpha$ of approximately 135° of the optical axes 11, 21 of the lenses 10, 20 relative to one another, the light sheet extends perpendicularly to the optical axis 21 and within the focal plane of the second lens, which acts as a first detective lens 20. The first detection beam 35 issuing from the specimen 1 passes through the first detection lens 20 along the optical axis 21 thereof and is guided onto a detector 36 by means of a first deflection mirror 37. At the same time, a second detection beam 35' issuing from the specimen 1 is guided through the first lens, which acts as a second detection lens 20' for this purpose, along the optical axis 21' thereof by means of a second deflection mirror 37 and a reverse beam splitter 39 onto the same detector 36. Since the light sheet in this arrangement does not extend perpendicularly to the optical axis 21' and therefore not within the focal plane of the second detective lens 20' it is, however, necessary to send the second detection beam 35' through a device 38 for oblique plane microscopy (OPM) beforehand in order to overlay the two images clearly according to Cutrale et al., loco citato. Using the arrangement according to FIG. 1e) it is possible to reverse the light path and to use the illuminating lens 10 simultaneously as a second detection lens 20', as a result of which a higher light yield is achieved here.

The embodiments of the arrangement of light sheet microscopes according to the embodiments of the invention shown in FIG. 1 can facilitate certain examination methods described hereinafter.

A. Light Sheet Microscopy Using the Same Lenses

For light sheet microscopy of large specimens, for example of fish embryos or plants, and of small specimens, which include cells and sub-cellular structures, two identical lenses having a mid to high numerical aperture are used with the same lenses and are arranged as in FIG. 1 at an angle α of approximately 135° relative to one another, as a result of which two channels can be excited and detected simultaneously.

In one embodiment, the excitation is performed using a first illuminating beam 33 having a first wavelength (here 488 nm) in the first lens 10, while the fluorescence signal, as the first detection signal 35, is captured by the two lenses 10, 20, merged and detected by means of a first detection device 36. To achieve this, a second excitation is performed simultaneously using a second illuminating beam 33' having a second wavelength (here: 561 nm) in the second lens 20, while the fluorescence signal resulting in the process, as a second detection signal 35', is again captured by the two lenses 10, 20, merged and detected by a second detection device 36'.

If a time series is recorded, the assignment of both excitation wavelengths to the lenses can be retained in a first embodiment. In a second embodiment in contrast, the assignment of the two excitation wavelengths to the lenses is defined alternately. The alternating nature of the illumination ensures improved illumination from different angles.

The simultaneous excitation and detection of two wavelengths allows a considerable time gain for light sheet microscopy. As a result of the simultaneous detection by means of two lenses 10, 20 using a detection device 36, the detectable signal is increased. A further advantage of this arrangement is the illumination of specimens, which are difficult to penetrate optically on one side. The described arrangement is suitable for optimal illumination and for the detection of such structures, for example in fish embryos which are near the yolk.

Figure 3:
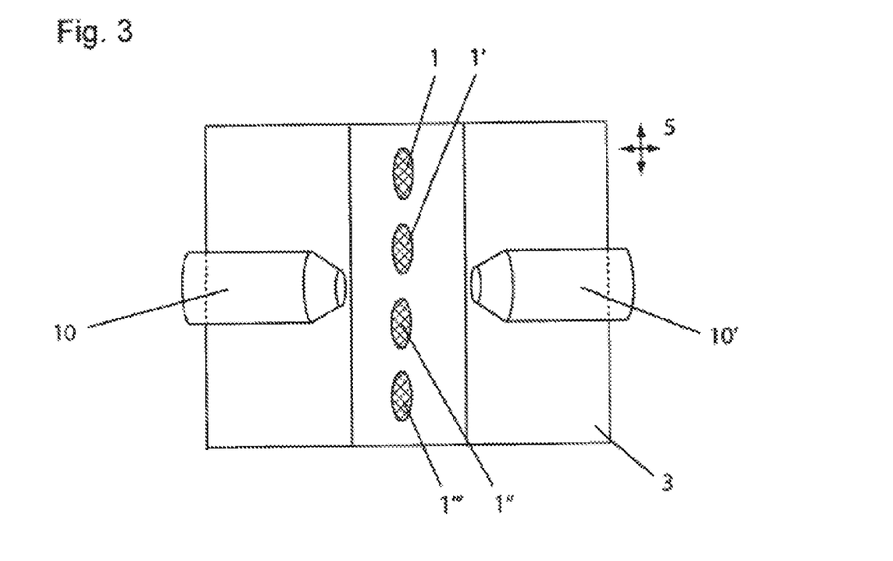
FIG. 3 shows a series of specimens to be examined on a stage that can be moved in a plane under a light sheet microscope according to an embodiment of the invention having one illuminating beam/lens and one detection beam/lens.
Figure 4:
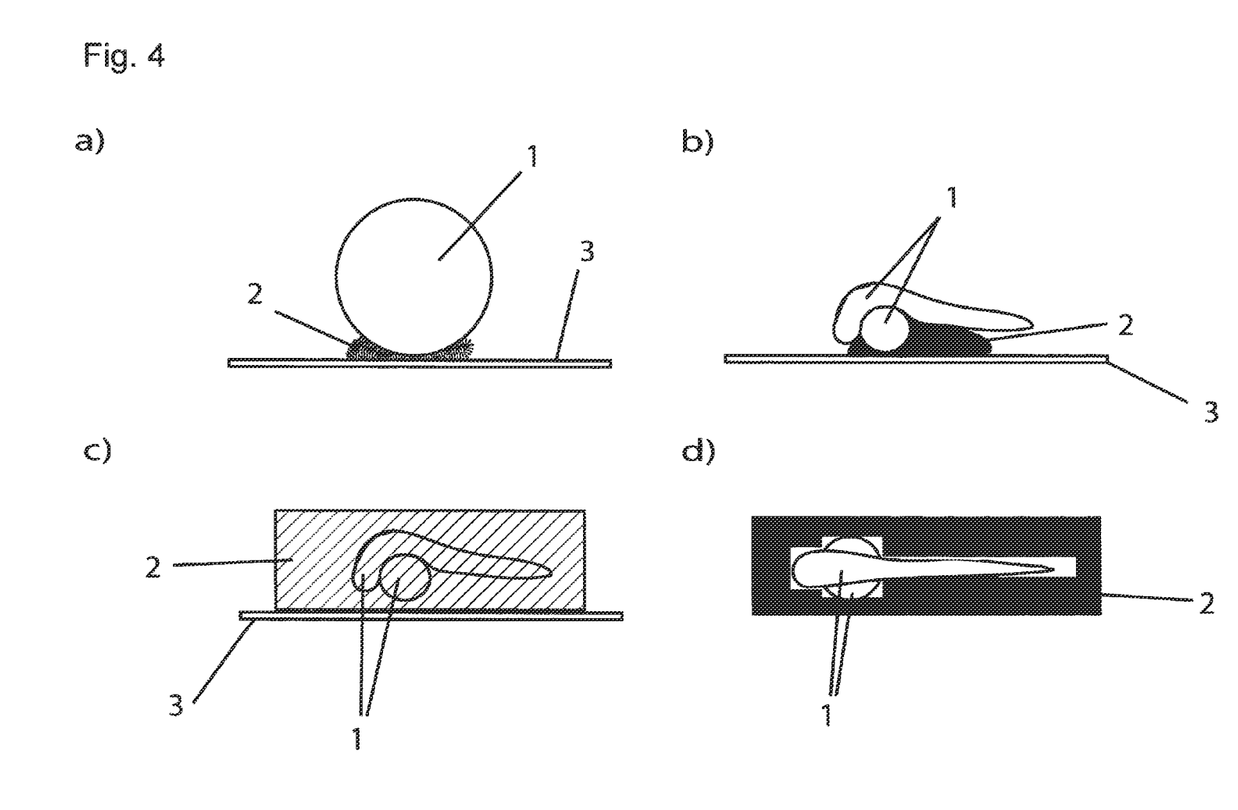
FIG. 4 shows typical biological specimens on a slide.

B. Light Sheet Microscopy Using Lenses of Different Numerical Aperture and Magnification FIGS. 2 to 4 show how light sheet microscopy of large specimens, for example of fish embryos or plants, can be arranged using lenses of different numerical aperture and magnification, having the possibility and device for observing a plurality of samples in a time lapse image.

Figure 2:
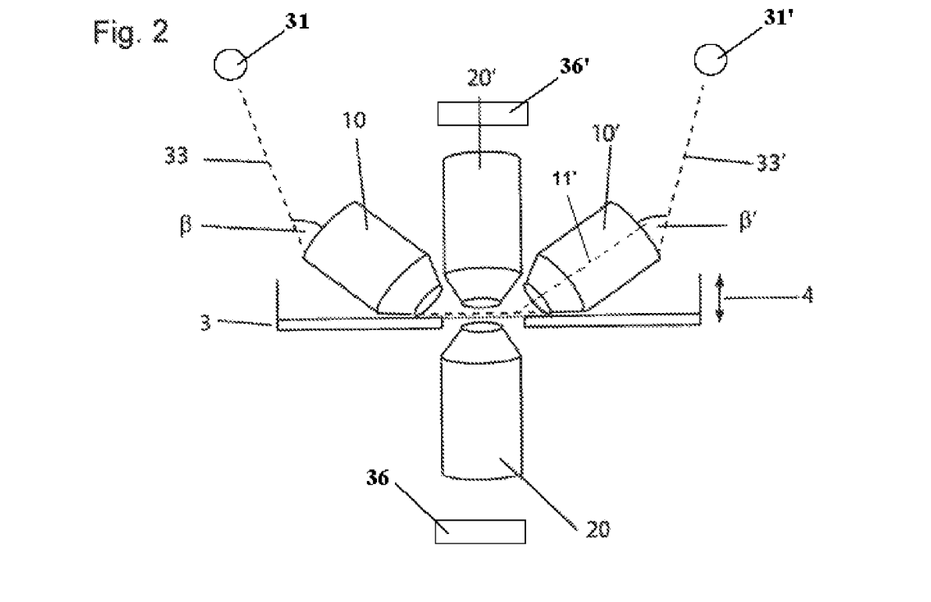
FIG. 2 is a schematic view of the construction and mode of operation of a light sheet microscope according to an embodiment of the invention having two illuminating beams/lenses and two detection beams/lenses.

According to FIG. 2 the sample is illuminated by a first illuminating lens 10 having a low numerical aperture (NA<0.2) and a very large free working distance (>3 mm). The light sheet is generated at an entry angle β of the first illuminating beam 33 into the first illuminating lens 10 and detected using a detection lens 20. In order to obtain illumination from both sides, a second illuminating lens 10' is added, into which a second illuminating beam 33' enters at an entry angle β'.

If the free working distance between the illuminating lenses 10, 10' is sufficient, a second detection lens 20' can optionally be added in order to achieve detection by means of the second detection lens 20' from two sides each having their own detection device 36, 36'. In order to move the specimen through the light sheet, all lenses 10, 10', 20, 10' remain fixed, only the stage 3 is moved in a manner that is accurate to the micron.

In FIG. 2 the use of immersion lenses as illuminating lenses 10, 10' is shown by way of example. If, on the other hand, air lenses are used, then it is advantageous to install a thin glass plate in between the specimen (which is not shown in FIG. 2) and the illuminating lenses 10, 10' respectively.

The construction selected in FIG. 1 is very suitable for detecting a plurality of large specimens in a time lapse image, as shown in FIG. 3. The specimens 1, 1', 1", 1''' are positioned in series at an appropriate distance from one another on the stage 3. In this case it is advantageous for the largest axis of the specimens 1, 1', 1", 1''' not to point in the direction of the lenses 10, 10', ..., 20, 20', ... if possible in order to allow good optical penetration. The specimens 1, 1', 1", 1''' are each brought into focus and detected at an appropriate time interval one after the other on the stage 3. In the process, the optimal position of each specimen 1, 1', 1", 1''' has been defined once at the beginning of the measurement and can now be repeatedly and automatically called up and taken up. The stage 3 can be moved in all three spatial directions by means of a movement arrangement 5. The specimens 1, 1', 1", 1''' also remain in their place and therefore in the medium when a new position is taken up.

Using the arrangement according to an embodiment of the invention, large specimens can easily be positioned on the stage 3 and do not have to be infused in an agarose cylinder as described in the prior art, as a result of which said specimens become inaccessible for later manipulation. On the contrary, a small stand of agarose is sufficient here, for example 2% agarose with a low melting point (low melting agarose).

In FIG. 4a) a positioned fish egg is shown schematically in this manner as the specimen 1, while FIG. 4b) shows a fish embryo, which was positioned with a drop of agarose, as the specimen 1.

FIG. 4c) is a side view of a zebra fish embryo as the specimen 1 in a chamber or a chamber that is easy to penetrate optically as a slide 2 and exhibits recesses at the growth points of the organism. FIG. 4d is a view from above of the zebra fish embryo as the specimen 1 in the chamber acting as the slide 2. If fish embryos are used, said embryos must be anaesthetised.

C. High-Resolution Light Sheet Microscopy Using Lenses of Identical Or Different Numerical Aperture and Magnification The construction for high-resolution light sheet microscopy of small specimens, for example cells and sub-cellular structures, and of large specimens, including fish embryos and plants, for example, using lenses of identical or different numerical aperture and magnification follows the schematic views of FIGS. 5 and 6.

Figure 5:
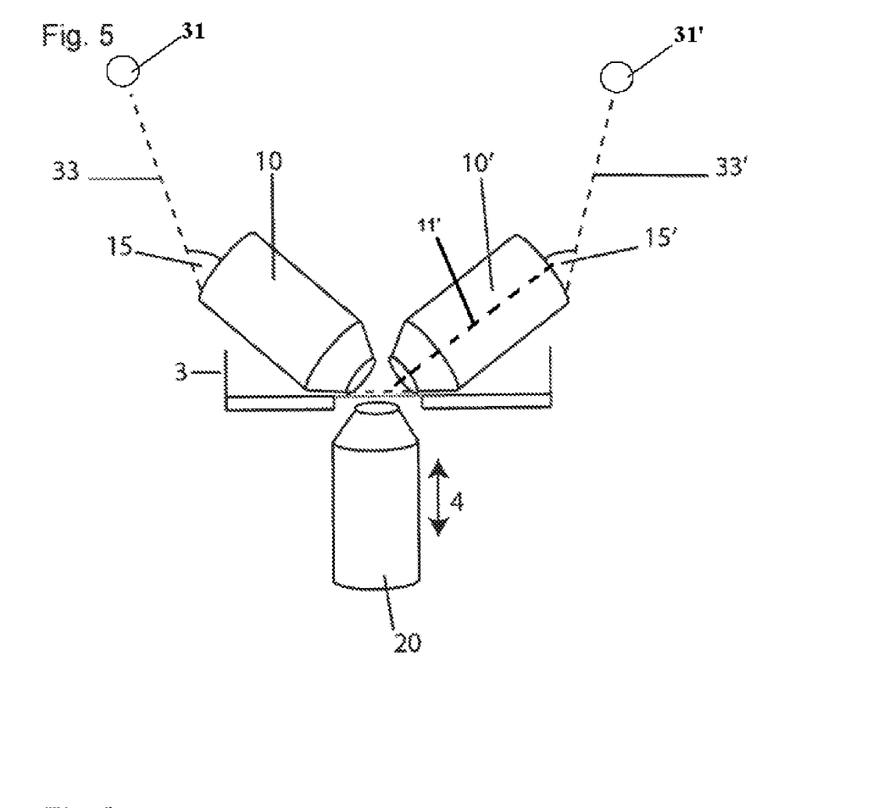
FIG. 5 is a schematic view of the construction and the mode of operation of a light sheet microscope according to an embodiment of the invention having two illuminating beams/lenses and one detection beam/lens having a fixed stage.

According to FIG. 5, the specimen is illuminated by an illuminating lens 10 having a high numerical aperture (NA>0.8 μm) in order to generate as thin a light sheet as possible (d<1 μm). The light sheet is generated at a high emission angle and detected by the detection lens 20. Provided the geometry and free working distance to the illuminating lens 10 allow, a structurally identical illuminating lens 10' can be added, as shown in FIG. 5, for double-sided illumination and thus double-sided detection can be achieved. In FIG. 5 the use of immersion lenses is shown by way of example.

In order to move the specimen through the light sheet, the at least one illuminating lens 10, 10' and the stage 3 remain fixed, while the angle of the optical axes 11, 11' of the at least one illuminating lens 10, 10' in relation to the stage 3 is changed by means of a device 15, 15' provided for this purpose. The detection lens 20 is repositioned synchronously to the movement of the light sheet for optimal detection.

The preparation for large specimens is as shown in FIG. 4. A two or three-dimensional in vivo cell culture or fixed cells and sub-cellular structures, for example a cytoskeleton, are, as shown in FIG. 6, prepared for high-resolution light sheet microscopy.

Figure 6:
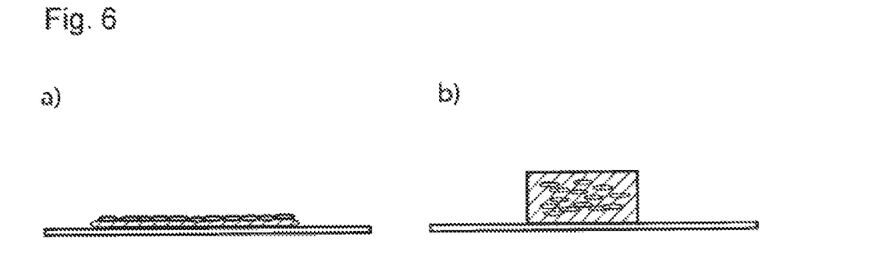
FIG. 6 shows biological specimens to be examined a) in the form of a two-dimensional in vitro cell culture on a layer of agarose, and b) in the form of a three-dimensional cell culture in a medium.

In this case, FIG. 6a) shows the preparation of a two-dimensional in vitro cell culture on a layer of agarose, while the preparation of a three-dimensional cell culture in a medium that is appropriate therefore, for example in agarose, collagen, a hydrogel or perfluoroethylene propylene copolymer film is shown in FIG. 6b).

D. Light Sheet Microscopy in Combination With Light Microscopy

All of the constructions described under items A. to C. can be combined with known inverse light microscopes. Using the selected arrangement it is possible to take over the stage 3, including, for example, a piezo stage, as well as the detection lens 20 directly with slight modifications.

Figure 7:
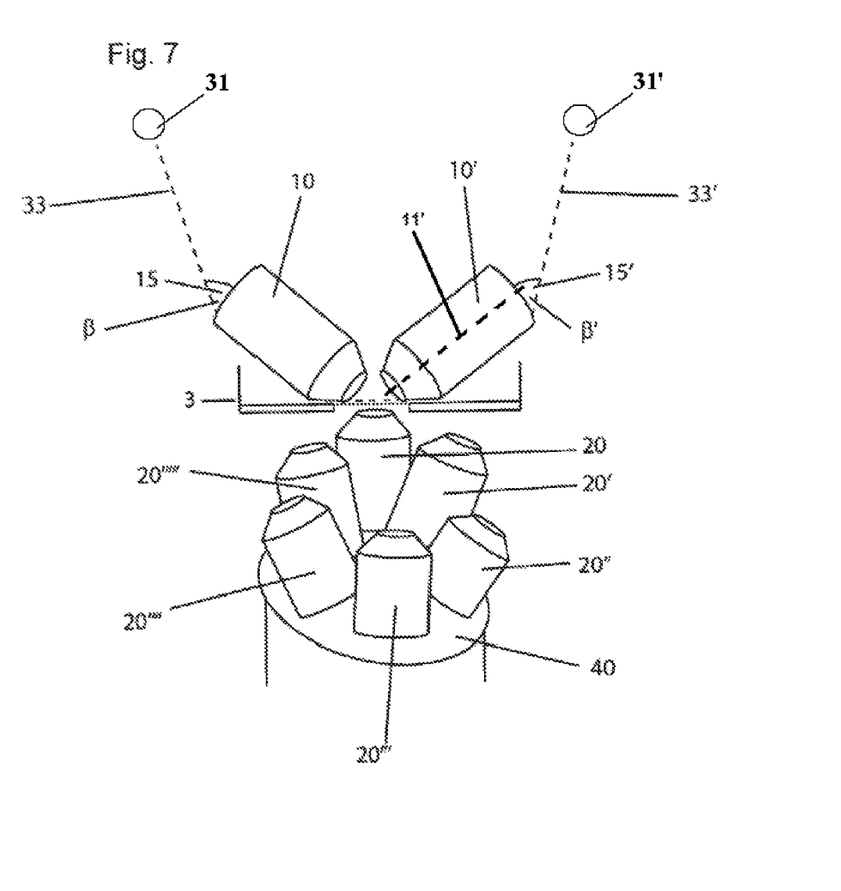
FIG. 7 is a schematic view of the construction and mode of operation of a light sheet microscope according to an embodiment of the invention having two illuminating beams/lenses and one nosepiece for capturing the detection beam.

As can be seen from FIG. 7, the use of a nosepiece 40, which has a series of detection lenses 20, 20', 20'', 20''', 20'''' for capturing the detection beam, is also possible.

E. Light Sheet Microscopy in Combination With Epifluorescence and/or High-Resolution Microscopy All of the constructions and combinations described thus far can be combined with epifluorescence and/or with known devices for high-resolution microscopy. In an embodiment, epifluorescence is incorporated by the second illuminating lens 10'.

In an alternative embodiment, the second illuminating lens 10' serves to use so-called photoactivation localization microscopy (PALM), a method known from high-resolution microscopy, and to combine it with light sheet microscopy.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

α, α' Angle between the optical axis 11, 11' of an illuminating lens 10, 10' relative to the optical axis 21, 21' of a detection lens 20, 20'
β, β' Angle of entry into an illuminating lens 10, 10'
1, 1' . . . Specimen (sample)
2 Slide (mount)
3 Stage (sample stage)
4, 5 Movement arrangements
10, 10' Illuminating lenses
11, 11' Associated optical axes
12, 12' Emission cones
15, 15' Device for changing the angle β,β'
20, 20' . . . Detection lenses
21, 21' Associated optical axes
22, 22' Entry cones
31, 31' Light Sources (excitation lasers)
32, 32' Focusing arrangements
33, 33' Specimen illumination region (light sheet)
35, 35' Detection beam
36, 36' Detection device (detector, camera)
37 Deflection mirror (dichromatic or normal)
38 Device for oblique plane microscopy (OPM) according to Cutrale et al., see above)
39 Reverse beam splitter
40 Nosepiece

The invention claimed is:

1. A microscope comprising:
a first illuminating lens configured to guide at least one first illuminating beam in the form of a first light sheet for illuminating at least one specimen to be examined;
a second illuminating lens configured to guide at least one second illuminating beam in the form of a second light sheet for illuminating the at least one specimen to be examined; and
at least one detection lens configured to capture at least one detection beam issuing from the at least one specimen to be examined,
wherein an optical axis of the first illuminating lens is at an angle α, which is not equal to 90°, to an optical axis of the at least one detection lens,
wherein an optical axis of the second illuminating lens is at an angle α', which is not equal to 90°, to an optical axis of the at least one detection lens,
wherein the at least one first illuminating beam enters the first illuminating lens at a non-zero entry angle β to the optical axis of the first illuminating lens, as a result of which the first light sheet lies within a focal plane of the at least one detection lens and extends perpendicularly to the optical axis of the detection lens, and
wherein the at least one second illuminating beam enters the second illuminating lens at a non-zero entry angle β' to the optical axis of the second illuminating lens, as a result of which the second light sheet lies within a focal plane of the at least one detection lens and extends perpendicularly to the optical axis of the detection lens.

2. The microscope according to claim 1, wherein the at least one first illuminating beam enters the first illuminating lens outside the optical axis thereof.

3. The microscope according to claim 2, wherein the angle α has a value from 120° to 150°.

4. The microscope according to claim 3, wherein the angle α has a value of approximately 135°.

5. The microscope according to claim 1, wherein at least two detection lenses are provided and arranged in an objective revolver.

6. The microscope according to claim 1, wherein structurally identical lenses are used for the at least one detection lens and at least one of the first illuminating lens or the second illuminating lens.

7. The microscope according to claim 1, further comprising:
at least two light sources, which radiate different wavelengths from one another; and
at least two detection devices configured to detect the wavelengths that are different from one another.

8. The microscope according to claim 1, further comprising a first movement arrangement configured to generate a relative movement between a specimen illumination region and the specimen to be examined, wherein the specimen is placed on a stage.

9. The microscope according to claim 8, further comprising a second movement arrangement configured to move the stage in one plane.

10. The microscope according to claim 8, wherein the specimen to be examined is placed on the stage by means of a slide.

11. The microscope according to claim 8, wherein the first illuminating lens and the at least one detection lens are each designed as immersion lenses and are located at least in part in an immersion medium together with the specimen to be examined.

12. The microscope according to claim 1, wherein the specimen to be examined is placed on a fixed stage, further comprising:

at least one device for changing the angle $\beta$, and wherein the focal plane of the at least one detection lens can be repositioned.

13. The microscope according to claim 1, wherein the at least one detection lens configured to capture at least one detection beam issuing from the at least one specimen to be examined comprises a first detection lens configured to capture a first detection beam issuing from the at least one specimen to be examined and a second detection lens configured to capture a second detection beam issuing from the at least one specimen to be examined, wherein the first detection lens has an optical axis and the second detection lens has an optical axis, and wherein the optical axis of the first detection lens is parallel to the optical axis of the second detection lens.

* * * * *